US012494971B2

(12) United States Patent
Pignataro et al.

(10) Patent No.: US 12,494,971 B2
(45) Date of Patent: Dec. 9, 2025

(54) SUSTAINABLE CROSS-DOMAIN DATA DISTRIBUTION INFRASTRUCTURE

(71) Applicant: Cisco Technology, Inc., San Jose, CA (US)

(72) Inventors: Carlos Pignataro, Cary, NC (US); Marcelo Yannuzzi, Nuvilly (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/189,879

(22) Filed: Mar. 24, 2023

(65) Prior Publication Data

US 2024/0323090 A1  Sep. 26, 2024

(51) Int. Cl.
  *H04L 41/12* (2022.01)
  *G06Q 50/06* (2024.01)
  *H04L 43/08* (2022.01)
(52) U.S. Cl.
  CPC ............. *H04L 41/12* (2013.01); *G06Q 50/06* (2013.01); *H04L 43/08* (2013.01); *Y02D 10/00* (2018.01)
(58) Field of Classification Search
  CPC ......... H04L 41/12; H04L 43/08; G06Q 50/06; Y02D 10/00
  See application file for complete search history.

(56) References Cited

U.S. PATENT DOCUMENTS

| 2010/0275147 | A1 | 10/2010 | Kaufman et al. |
| 2015/0081374 | A1 | 3/2015 | Sahlstrom et al. |
| 2016/0078220 | A1* | 3/2016 | Scharf ..................... H04L 41/14 726/1 |
| 2016/0203568 | A1 | 7/2016 | Patel et al. |
| 2018/0239764 | A1 | 8/2018 | Walker et al. |
| 2019/0138995 | A1* | 5/2019 | Currin ................. G06F 16/9035 |
| 2020/0167205 | A1* | 5/2020 | Guim Bernat .......... H04L 49/70 |
| 2022/0006701 | A1* | 1/2022 | Patel ....................... H04L 41/22 |

(Continued)

OTHER PUBLICATIONS

Ahi, P. et al. "An Analysis of Metrics Used To Measure Performance in Green and Sustainable Supply Chains," ScienceDirect, Jan. 1, 2015.

*Primary Examiner* — Tonia L Dollinger
*Assistant Examiner* — Joseph M Cousins
(74) *Attorney, Agent, or Firm* — Rutan & Tucker, LLP; Ravi Mohan; Marc A. McClain

(57) ABSTRACT

Described herein are embodiments related to systems, methods, and processes for sharing sustainability-related attributes and data across multiple domains. More specifically, some embodiments describe a sustainability aggregation device which may include a controller or other processor, and a memory. The memory includes a sustainability aggregation logic that can receive telemetry data associated with a first network domain, and in response, generate a multi-layer topology graph for the first network domain. In response to the graph being generated, it can be augmented with one or more sustainability-related attributes. However, the device can prune the augmented multi-layer topology graph based on one or more export policies and export the pruned augmented multi-layer topology graph to a second network domain. The multi-layer topology graph may also be utilized within a closed-loop system to monitor various aspects of the network domain and adjust one or more configurations as needed based on the received data.

18 Claims, 8 Drawing Sheets

(56) References Cited

U.S. PATENT DOCUMENTS

| | | | |
|---|---|---|---|
| 2022/0108252 A1* | 4/2022 | Narasimhan | G06Q 10/30 |
| 2023/0368107 A1* | 11/2023 | Reineke | G06Q 10/06 |
| 2024/0004361 A1* | 1/2024 | Morris | G05B 15/02 |
| 2024/0031449 A1* | 1/2024 | Rogynskyy | G06F 16/24558 |
| 2024/0195714 A1* | 6/2024 | Zlatniczki | H04L 43/045 |

* cited by examiner

SUSTAINABLE CROSS-DOMAIN DATA DISTRIBUTION INFRASTRUCTURE

The present disclosure relates to network domain management. More particularly, the present disclosure relates to collecting and augmenting data with sustainability-related attributes to share across network domains.

BACKGROUND

The development of sustainable infrastructures is one of the key elements in the agenda of many governments and corporations. As both public and private organizations transition toward digitized environments, a significant part of the sustainability efforts are focused on IT, including networking, datacenters, and cloud infrastructures. However, the mere assessment of the environmental impact of a networked infrastructure requires the capacity to measure, distribute, collect, aggregate, observe, and even share various data, such as metrics, scores, etc., not only within the organization but also with third parties.

More specifically, organizations lack automated means to aggregate power consumption and greenhouse gas-related metrics, and selectively control what to export to other domains, especially, in multivendor infrastructures. For instance, by exporting metrics to a certification entity (e.g., to attest compliance with datasheet specifications), or an auditing entity (e.g., to verify compliance with the requirements defined in an RFP), or the hardware vendors themselves, or a solution provider specialized in energy optimization and efficiency, or others.

Existing techniques do not cover power consumption and GHG-related metrics in the data exchange. This limits not only the assessment and observability of the environmental impact of a networked infrastructure but also the capacity to steer traffic to more sustainable or "greener" infrastructures.

SUMMARY

Systems and methods for providing sustainable cross-domain data distribution in accordance with embodiments of the disclosure are described herein. In many embodiments, a method can include receiving telemetry data associated with a first network domain and generating a multi-layer topology graph for the first network domain. The method can also augment the multi-layer topology graph with one or more sustainability-related attributes and prune the augmented multi-layer topology graph based on one or more export policies. Subsequently, the method can export the pruned augmented multi-layer topology graph to a second network domain.

In a number of embodiments, the telemetry data is received in real-time or near-real time.

In further embodiments, the receiving of telemetry data is based on a sampling configuration.

In additional embodiments, the sampling configuration includes a criteria of power consumption metrics, and a predetermined sampling frequency.

In more embodiments, the one or more sustainability-related attributes include at least one of the group of geolocation data, collateral consumption data, energy source data, or cost per source data.

In some embodiments, pruning of the augmented multi-layer topology graph includes generating a subgraph.

In still more embodiments, the subgraph obfuscates the one or more sustainability-related attributes.

In yet further embodiments, the obfuscation is performed by applying at least one filter to the augmented multi-layer topology graph.

In still additional embodiments, the at least one filter is based on one or more data governance rules or governmental regulations.

In some further embodiments, pruning of the augmented multi-layer topology graph is based on one or more characteristics of the second network domain.

In yet more embodiments, a sustainability aggregation device, includes a controller, and a memory, the memory includes a sustainability aggregation logic configured to receive telemetry data associated with a first network domain. The sustainability aggregation device can further generate a multi-layer topology graph for the first network domain and augment the multi-layer topology graph with one or more sustainability-related attributes before pruning the augmented multi-layer topology graph based on one or more export policies. The device may also export the pruned augmented multi-layer topology graph to a second network domain.

In some additional embodiments, the receiving of telemetry data is based on a sampling configuration.

In still further embodiments, the sampling configuration includes a criteria of power consumption metrics, and a predetermined sampling frequency.

In many additional embodiments, the one or more sustainability-related attributes include at least one of the group of geolocation data, collateral consumption data, energy source data, or cost per source data.

In various embodiments, pruning of the augmented multi-layer topology graph includes generating a subgraph.

In certain additional embodiments, the subgraph obfuscates the one or more sustainability-related attributes.

In still yet more embodiments, the obfuscation is performed by applying at least one filter to the augmented multi-layer topology graph.

In many additional embodiments, the at least one filter is based on one or more data governance rules or governmental regulations.

In further additional embodiments, a network device, can include a controller, a plurality of observability elements, and a memory. The memory may include an observability logic configured to collect data from the plurality of observability elements at a first predetermined rate, and the collected data includes at least one sustainability-related attribute. The logic may also generate observability data based on collected data, transmit the generated observability data to a second network device, and receive sampling configuration data from the second network device, which can be used to adjust the rate of collecting data.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The description of the present disclosure will be more fully understood with reference to the following figures, which are presented as exemplary embodiments of the disclosure and should not be construed as a complete recitation of the scope of the disclosure, wherein.

Figure 1:
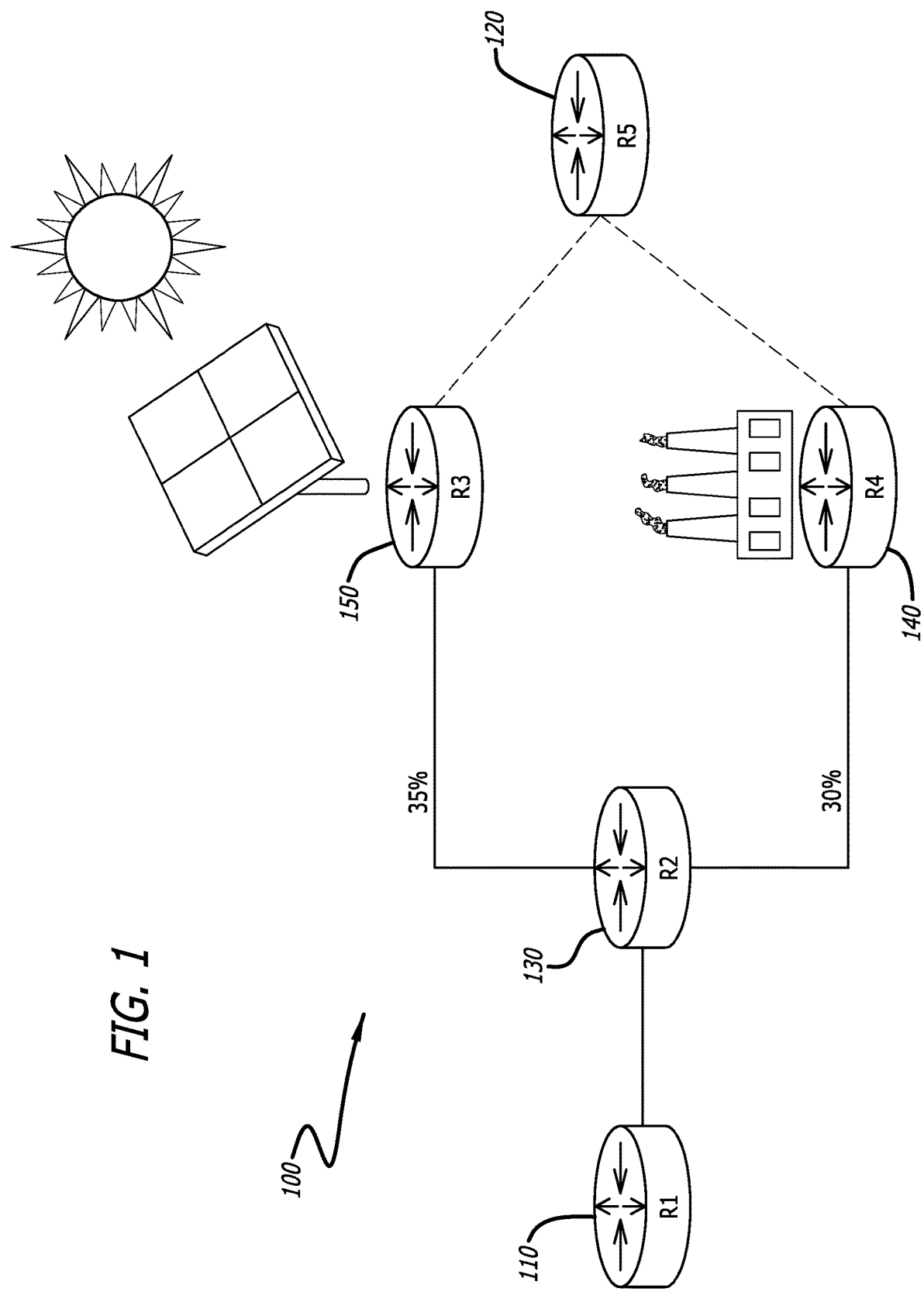
FIG. 1 is a schematic diagram of a network with network devices powered by various power source types in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that manage a sustainable cross-domain data distribution infrastructure. There is a growing need for solutions enabling observability and assessment of the environmental impact of a networked infrastructure both with and across administrative domains. Embodiments described herein can sample various data, such as sustainability-related attributes of various devices with a network domain and generate shareable data that can be transferred to a second domain. In many embodiments, the sharing can be done by generating a multi-layer topology graph that can comprise a variety of different data points.

However, it may be the case that not all data generated may want to be shared. For example, various governmental regulations or laws may limit the amount of data that can be shared. Some recipients of the data may only be interested in certain aspects of it. For example, a manufacturer of network devices may be interest in the energy usage of its network devices in the field but may not want or need data relating to other network devices. Thus, it may be advantageous in a variety of embodiments to prune the generated multi-layer topology graph and otherwise customize it for delivery to one or more external domains.

In a variety of embodiments, the generated graph data may also be utilized within a closed-loop style system within the originating domain. For example, a controller or other logic tasked with monitoring or supervising various elements within the network can be configured to receive this generated graph data and adjust one or more settings, alter traffic flow, or change some other configuration. This can be done to increase overall network sustainability by lowering energy usage, or to generate one or more notifications when deviations from normal usage are detected.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors, logics, or controllers. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, controller, logic, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component or element may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor, controller, and/or logic of a computer or other programmable data processing apparatus to produce a machine, such that the instructions, which execute via the processor, controller, logic, or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic diagram of a network 100 with network devices powered by various power source types in accordance with an embodiment of the disclosure is shown. The network 100 can include a plurality of devices, e.g., routers 110, 130, 140 and 150, which can be in communication with each other and/or a remote server, such as a cloud-based server 120. The network 100 depicted in FIG. 1 is shown as a simplified, conceptual network. Those skilled in the art will understand that a network 100 can include a large variety of devices and be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," and "power plant" when describing energy delivery, even though those skilled in the art will recognize that those elements are delivering or processing energy (specifically electricity) at a certain rate of power. References to these terms are utilized specifically to increase the ease of reading.

Traditionally, devices operating within a network 100 have not considered various aspects of operation that can relate to the overall sustainability of the network. For example, devices in communication networks have often used grid-supplied energy as a primary power source. This grid-supplied energy can regularly provide energy that has been generated by a pollution-heavy power source such as a coal-powered power plant. However, modern power grids often have more diverse and cleaner energy sources for the provided generated energy. Some devices can still be powered by power sources that utilize fossil fuels, such as the router R4 140 as depicted in FIG. 1. Alternatively, some devices can operate by using renewable sources of energy, such as the router R3 150 which is conceptually depicted as being powered by solar power.

Those skilled in the art will recognize that the generation of electricity within the various power plants often creates some pollution, often in the form of emissions. For example, the operation of a coal-powered power plant will create a sizeable amount of pollution in the form of carbon emissions. Contrast that with a solar array which may not create emissions when generating electricity, but may negative environmental impacts, such as carbon emission generation, associated with the production and/or disposal of the solar array. Various methods of measuring this pollution may occur. One measurement may be to examine the waste products created by the power generated (such as nuclear waste, vs. solar array e-waste, etc.).

Another measurement of pollution that can be utilized when comparing power sources is to determine the amount of greenhouse or carbon emissions released per unit of electricity generated. Specifically, various embodiments described herein may utilize the $CO_2$ kg/kWh metric which measure the amount of kilowatt hours produced per kilogram of carbon dioxide gases released into the environment. Therefore, when discussing a pollution-heavy power source compared to a clean(er) power source, the clean power source can, for example, have a better $CO_2$ kg/kWh rating compared to the pollution-heavy power source. Utilizing a cleaner power source thus provides for a more sustainable network operation.

In order the maximize the sustainability of a network, it may be desirable to increase the use of clean power sources as opposed to pollution-heavy power sources when operating the network. Thus, there can be a need to be aware of the source of energy provided at each device along the route of data travel. Once known, an optimal method of traversing the data may need to be calculated. As discussed in more detail, this path algorithm can be utilized to better optimize the locations selected within a network for data travel.

Other methods may be utilized to increase sustainability in network operation. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to an event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability-related attributes of that network device. During operation, one or more devices within the network may seek and collect the sustainability-related attributes of various network devices, which can provide insight into both the type of power source providing power to the device, but also the various capabilities of the network device that may be activated to provide more efficient operation.

Additionally, when generating or collecting other various sustainability-related metrics, scores, or other evaluations of the network 100 and/or network devices, the sustainability-related metrics and attributes can vary based on a variety of factors such as the time of day, current network traffic, expected network traffic, and historical usage patterns. For example, a network router may receive energy from a solar power source during the day but receives energy from a coal-powered power plant at night, which may affect the sustainability-related attributes of the router but may also affect the sustainability-related metrics of the router within the network 100. In these instances, an averaged score may be used, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

Although a specific embodiment for a network 100 is described above with respect to FIG. 1, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 1 may also be interchangeable with other elements of FIGS. 2-8 as required to realize a particularly desired embodiment. Augmented protocols to carry out these described processes are described below.

Figure 2:
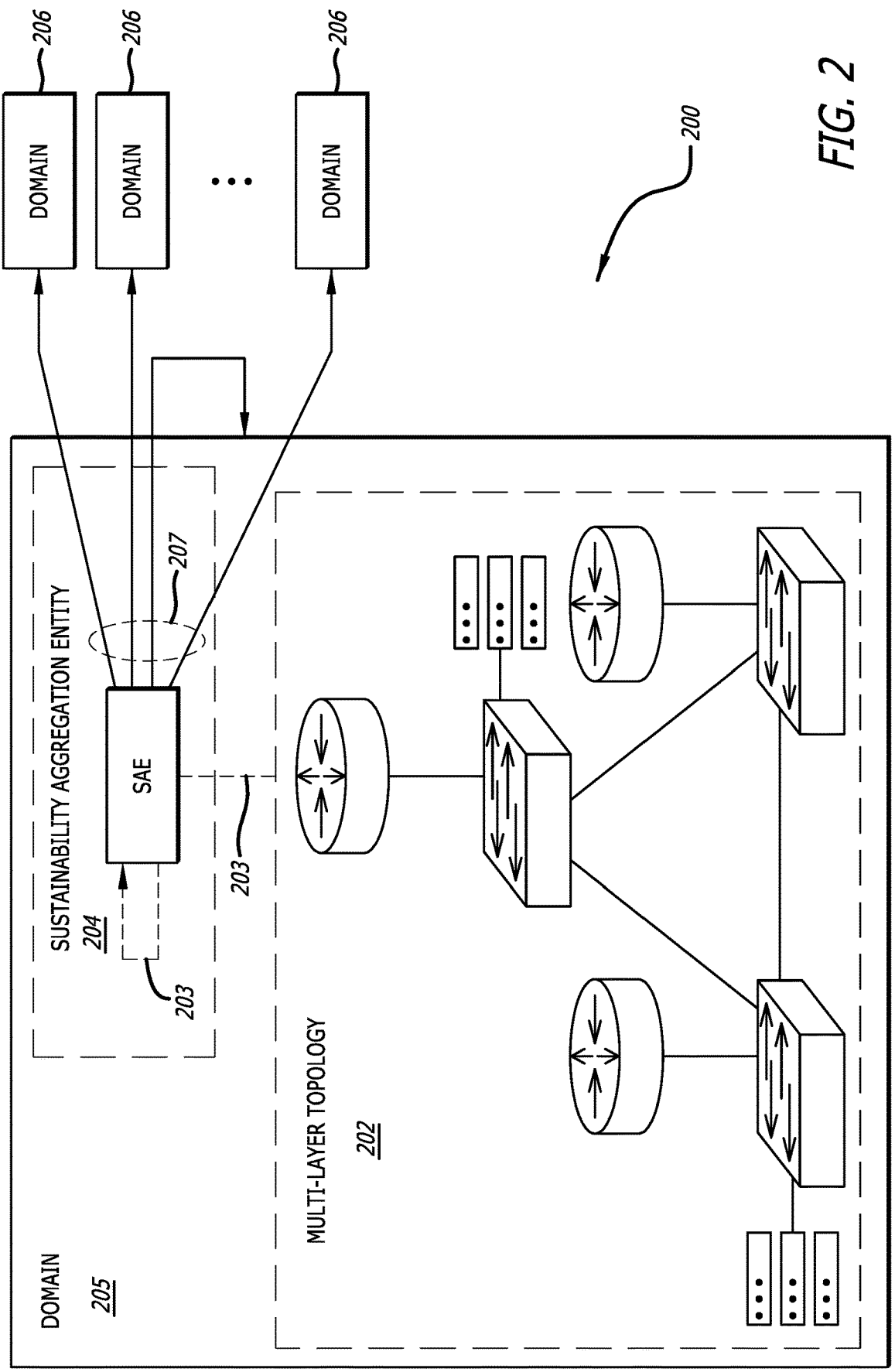
FIG. 2 is a schematic block diagram of a sustainability aggregation entity within a network domain in accordance with various embodiments of the disclosure.

Referring to FIG. 2, a schematic block diagram of a sustainability aggregation entity 204 within a network domain 205 in accordance with various embodiments of the disclosure is shown. In many embodiments, an example network domain 205 may a plurality of switches, routers, compute nodes, storage, and other elements, each of which consume energy. In the embodiment depicted in FIG. 2, the network is represented as a multi-layer topology 202, where information about the energy consumed by the different elements might be collected as real-time telemetry data 203. However, in further embodiments, the telemetry may be near-real time.

The telemetry data 203 can be sent to a sustainability aggregation entity 204. In various embodiments, the telemetry data 203 can include information associated with the energy consumed by elements or components that are related to one or more network devices, support the sustainability aggregation entity, and/or any observability elements, which can allow for the quantification of one or more sustainability-related attributes and/or metrics, such as those described within the discussion of FIG. 1.

In additional embodiments, the multi-layer network and sustainability aggregation entity 204 may be part of a single administrative domain 205, which may be configured to share power consumption information or one or more sustainability-related attributes and/or metrics with one or more external domains 206. Often this can be accomplished through at least one data exchange which may be selectively handled by the domain 205, depending on the destination domain. More specifically, the domain 205 may apply different techniques, filtering, and applied export policies (conceptually represented as 207). By utilizing these techniques, the system 200 can enable the sustainability aggregation entity 204 to control or direct power consumption data, such as data associated with a sustainability-related attributes and/or one or more sustainability-related metrics to one or more external domains 206.

Figure 3:
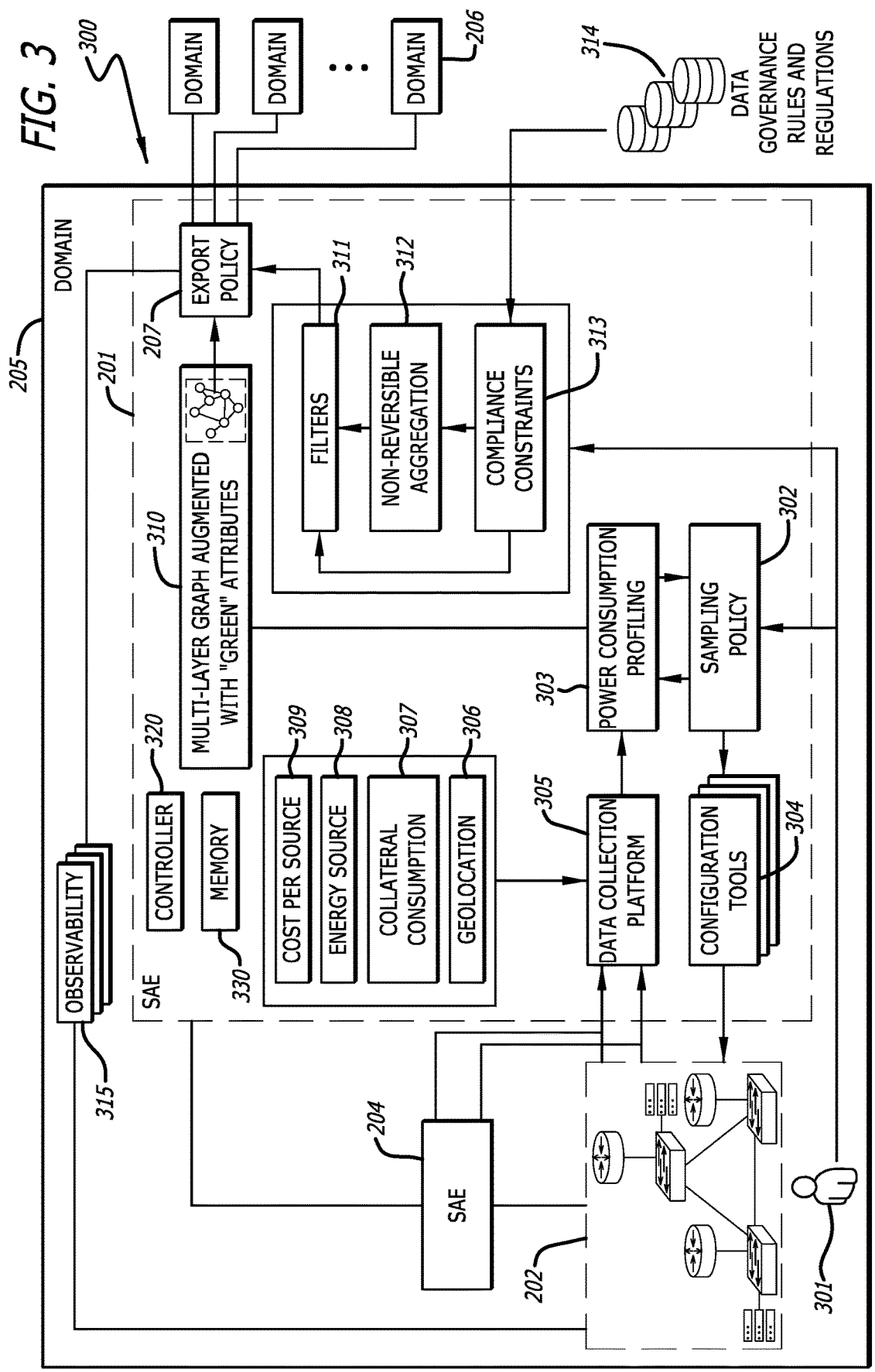
FIG. 3 is a more detailed schematic block diagram of a sustainability aggregation entity within a network domain in accordance with various embodiments of the disclosure.

Referring to FIG. 3, a more detailed schematic block diagram of a sustainability aggregation entity 204 within a network domain 205 in accordance with various embodiments of the disclosure is shown. Specifically, the embodiment depicted in FIG. 3 can be considered a more detailed version of the embodiment depicted in FIG. 2, wherein more detail is shown on the various components of a sustainability aggregation entity 204. As such, the network which comprises a multi-layer topology 202 is still communicatively coupled to the sustainability aggregation entity 204, which can then export various data, including sustainability-related attributes and/or metrics, to one or more external domains 206.

In many embodiments, such as the one depicted in FIG. 3, the sustainability aggregation entity 204 may further comprise a controller/processor 320, a memory 330, and various sustainability-related attribute and/or metric data such as the group comprising geolocation data 306, collateral consumption data 307, energy source data 308, and cost per source data 309. In further embodiments, various tools and platforms may be configured to manage data such as, but not limited to, a data collection platform 305, a sampling policy logic 302, a power consumption profiling logic 303, and one or more configuration tools 304. In more embodiments, various data sources can be utilized by one or more tools or platforms to generate a multi-layer topology graph 310. Specifically, in a number of embodiments, the multi-layer topology graph 310 is generated and augmented with one or more "green" or sustainability-related attributes.

In additional embodiments, the multi-layer topology graph 310 can be pruned with one or more sources of data such as through an export policy 207 which can be comprised of, but is not limited to, filters 311, non-reversible aggregation functions 312, or compliance constraints 313. In various embodiments, the compliance constraints 313 can be modified or otherwise guided by one or more data governance rules and regulations 314. Additionally, an export policy 207 can be modified through one or more an observability logic (not shown) which can direct one or more observability elements 315. Finally, an administrator 301 can adjust or otherwise affect one or more components or data sources within the system 300 based on the desired application.

Although a specific embodiment for a sustainability aggregation entity system 300 is described above with respect to FIG. 3, any of a variety of systems and/or processes may be utilized in accordance with embodiments of the disclosure. For example, the sustainability aggregation entity 204 may be a unique device or can be installed as part of a different network device as either hardware logic, software, or the like. The elements depicted in FIG. 3 may also be interchangeable with other elements of FIGS. 1-2 and 4-8 as required to realize a particularly desired embodiment.

Figure 4:
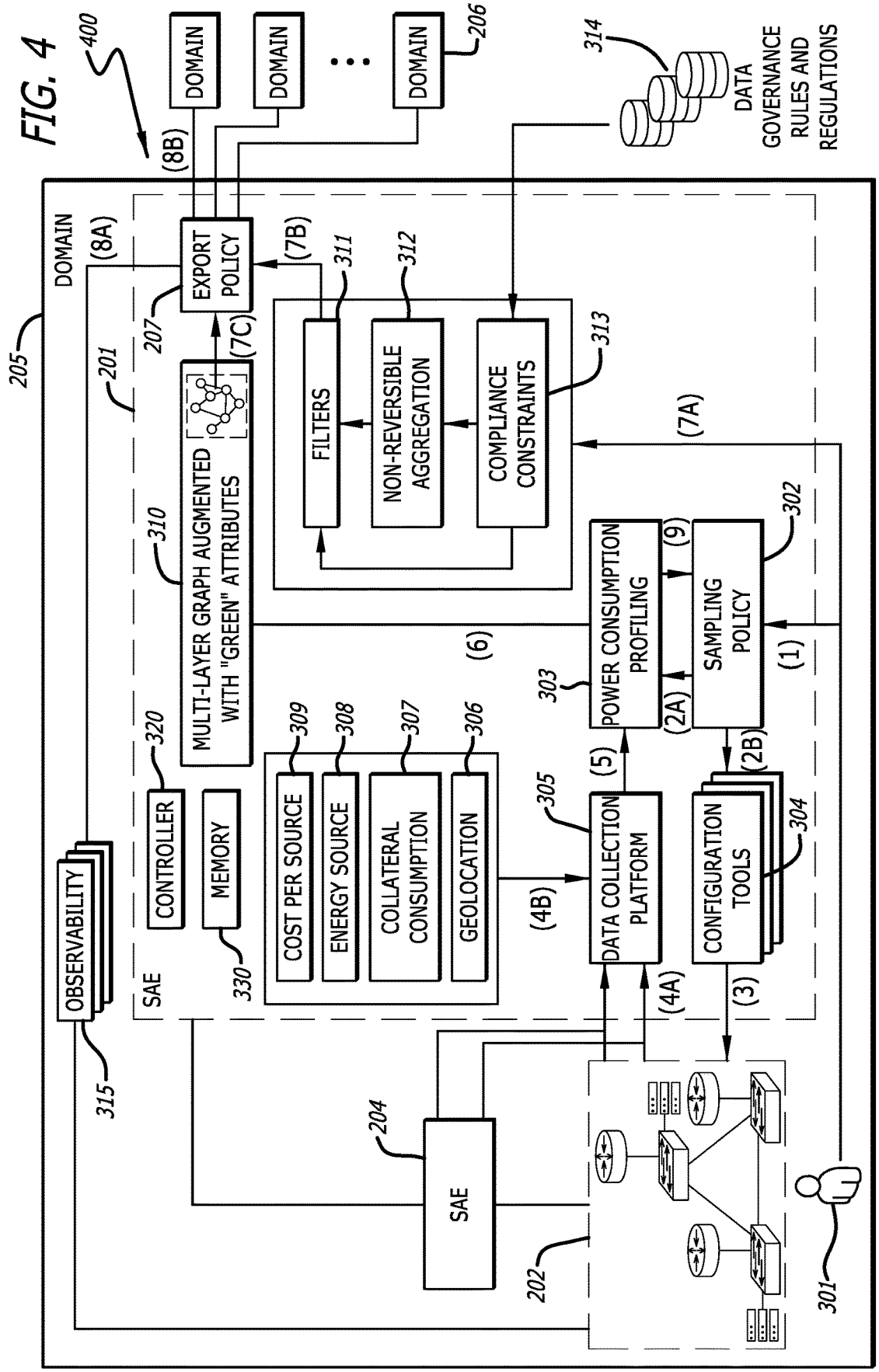
FIG. 4 is a process for cross-domain network communication utilizing a sustainability aggregation entity within a network domain in accordance with various embodiments of the disclosure.

Referring to FIG. 4, a process 400 for cross-domain network communication utilizing a sustainability aggregation entity 204 within a network domain 205 in accordance with various embodiments of the disclosure is shown. In the embodiment depicted in FIG. 4, the process may have an administrator 301 which may utilize a sampling policy logic 302 to define the criteria and frequency to collect one or more sustainability-related attributes and/or metrics, such as, but not limited to, power consumption metrics from one or more elements contained within the various network devices within the multi-layer topology 202 (step 1). In further embodiments, the sampling policy logic 302 may additionally collect data from one or more network devices that comprise or support observability elements 315 along with the functionality provided by the sustainability aggregation entity 204.

Upon defining the criteria, the sampling policy logic 302 can transmit the criteria to both a power consumption profiling logic 303 (step 2A), and to one or more configuration tools 304 (step 2B) that can manage the different sampling configurations on the various elements of the network devices within the multi-layer topology 202. As a result, in many embodiments, the different sampling configurations within the defined criteria are transmitted or pushed to all of the elements affected, including within the sustainability aggregation entity 201 itself, and the one or more observability elements 315 (step 3). In further embodiments, the sampling can be done by a specific device and transmitted to each network device on command or as needed.

In more embodiments, a data collection platform 305 can be utilized to collect and store data from various sources. In some embodiments, the sources can include receiving real-time telemetry data about the energy consumed by one or more elements in the multi-layer topology 202 as well as the sustainability aggregation entity 204 as well, including any available and/or compatible observability elements 315 (step 4A). In additional embodiments, the topological information of the multi-layer network, the sustainability aggregation entity 204, and the observability elements 315 which may include, for example, a link-state graph of the network infrastructure combined and augmented with server storage, the sustainability aggregation entity 204, and the observability application-level graphs. In one non-limiting example, a topology link-state graph augmented with sustainability-related (i.e., "green") attributes. More specifically, embodiments of the data collection platform 305 can support metrics, events, logs, and/or traces, along with additional metadata allowing the power consumption profiling logic 303 to infer, construct, and enrich a multi-layer topology graph representing the main elements of the network (switches, routers, servers, storage, processors, etc.) consuming power in the domain 205 (step 4B).

In a number of embodiments, deferred-time aggregated and anonymized telemetry data may also be utilized. In the embodiment depicted in FIG. 4, the sustainability aggregation entity 204 can utilize information collected by the data collection platform 305 which might be augmented with additional metadata. Sources of this metadata can include, but is not limited to geolocation data 306 associated with the various elements involved, collateral consumption data 307, such as cooling, heating, lighting or other data related to, for example, in a data center or on a premises, etc. Additional sources of data can include energy source data 308 that indicates power sources of the main elements involved as well as collateral equipment (associated with the collateral consumption data 307). Finally, another source of data can include cost per source data 309 which may indicate the cost per kilowatt-hour, or comprise tables with various costs breakdowns, etc. associated with each energy source utilized.

In many embodiments, a power distribution graph may also be available or inferable by the power consumption profiling logic 303. In additional embodiments, the multi-layer topology graph inferred and generated by the power consumption profiling logic 303 may also be even more granular in nature. By way of non-limiting example, the infrastructure may add consumption metrics and/or estimated values for containerized runtime environments, including nodes, pods, Kubernetes management planes, virtual machines, serverless functions, security, and/or operational processes, etc.

In more embodiments, there may be one or more requirements for providing cryptographic data origin authentication. This may be critical for embodiments that utilized when transferring data where the distribution mode covers peering protection. This can also allow for providing (cryptographic) compliance of the data. In certain embodiments, this can allow for the generation of a trusted execution environment.

As previously stated, data can be gathered and stored by the data collection platform 305 (step 5). This may enable the power consumption profiling logic 303 to infer, construct, and maintain a multi-layer topology graph 310 (step 6). In further embodiments, the multi-layer topology graph 310 can be augmented and/or otherwise enriched with accurate and updated power consumption information, cost, and relevant sustainability-related attributes and/or metrics. A combination of sampling and update policies may allow an administrator 301 within the domain 205 to refresh the multi-layer topology graph 310 and its related data as needed.

In additional embodiments, the multi-layer topology graph can be configured as a multi-dimensional matrix, on which data can pivot through various surfaces (two key ones being 'services and applications' and 'devices and modules'). In a non-limiting example, the data and metrics granularity can be seen within the 'services and applications' portion through an application or process, while the 'devices and modules' portion can be seen from a device to a line-cart to a port and optical module.

Often, the topological and power related information contained in the multi-layer topology graph 310 is highly valuable to the domain 205. As such, in a number of embodiments, there may be a desire to not share certain information outside of the domain 205 or with certain entities. Therefore, various embodiments can provide for selectively controlling and exporting of data such as one or more elements within the multi-layer topology graph 310. This pruning of data can be set up by an administrator 301 as a set of rules or export policy 207 (step 7A).

In certain embodiments, an administrator 301 can apply different types of filters 311, including non-reversible aggregation functions 312, and/or compliance constraints 313. This may be utilized to prune the graph, obfuscate elements within the graph, aggregate information, and/or provide solely values or metrics without disclosing any graphical representation of the environment, or alternative outcomes consistent with the data governance rules defined by the domain 205. Often these compliance constraints 313 will originate in one or more data governance rules and regulations 314 which may be stored as data within the domain 205 or, in some cases, external to the domain 205.

In a non-limiting example, the domain 205 may be required, due to regulatory compliance reasons, to disclose specific power consumption information and/or the sources of energy utilized for auditing purposes. In further examples, the domain 205 may be willing to export a subgraph of the multi-layer topology graph 310 and share historical data or stream data in near real-time for a subgraph to be delivered to another entity or domain. The external domain 206 may help the first domain 205 through consulting services and/or by providing one or more tools for analyzing and subsequently optimizing the power consumption of the first domain 205. In yet another embodiment, the domain 205 may selectively share controlled (i.e., filtered) information with specific device vendors to demonstrate and/or analyze deviations from power consumption values claimed in the manufacturer's data sheets. This sharing may also be utilized for planning on equipment refresh cycles. In this way, it can be understood what benefits of migration to a newer generation of devices may yield, etc. Similarly, a portion of the information captured in the multi-layer topology graph 310 may be exported internally within the domain for comparison and assessment of one or more values claimed within the vendor's data sheets after a purchase.

The combination of filters, non-reversible aggregation techniques, and enforcement of compliance constraints may be utilized as inputs by an export policy 207 (step 7B). This policy may be executed as part of a logic. Additionally, various embodiments the export policy 207 can accept the multi-layer topology graph as input (step 7C) and apply the various pruning conditions to generate a vector or compounded distribution policy on which the vectors can be multiplied between data characteristics, metadata, outcome desired, and potential consumer, etc.

By utilizing these inputs, the sustainability aggregation entity 204 can selectively prune the multi-layer topology graph 310, obfuscate and aggregate power consumption information and/or one or more sustainability-related attributes, and export a series of subgraphs, each tailored to a unique destination, consumer, and/or use. In several embodiments, the generated graphs and data may be utilized internally (step 8A). In a non-limiting example, one or more observability elements 315 may provide tailored visibility to different stakeholders and/or tenants of the domain 205 depending on their privileges or needs. This can include customizing data for use by specific device manufacturers, models, devices, etc. In still further embodiments, the generated graphs and data can be selectively exported to external domains 206 (step 8B). This can be done in a variety of ways including, but not limited to, a push or pull application programming interface (API), as a batch data transfer, and/or as a streaming data transfer.

In many embodiments, the data contained in the data collection platform 305 may also be configured to allow for the replay of data, the creation of histograms, and to allow for the power consumption profiling logic 303 to find deviations from nominal power consumption patterns and sustainability-related attributes. More specifically, the augmented multi-layer topology graph generation, along with the various processing, analysis, and inference generation involved may allow for the sustainability aggregation entity 204 to trigger one or more changes within the sampling policy logic 302, which may comprise a closed-loop control. In a non-limiting example, if one or more elements within the domain 205 suddenly start consuming more power than normal, the sustainability aggregation entity 204 may dramatically reduce the sampling rate and even power off elements involved in the monitoring, observability, and exportation of sustainability-related attributes until the peak disappears. Similarly, if the elements in the domain 205 start resuming their nominal power consumption values, the sustainability aggregation entity 204 may gradually increase the sampling rate, as well as power on or scale up various elements in the monitoring, observability, and exportation of power consumption metrics.

Although a specific embodiment for cross-domain network communication utilizing a sustainability aggregation entity 204 within a network domain 205 is described above with respect to FIG. 4, any of a variety of systems and/or processes may be utilized in accordance with embodiments of the disclosure. For example, the sustainability aggregation entity 204 may be operated within the domain 205 but may also be operated externally by a vendor device as a service. The elements depicted in FIG. 4 may also be interchangeable with other elements of FIGS. 1-3 and 5-8 as required to realize a particularly desired embodiment.

Figure 5:
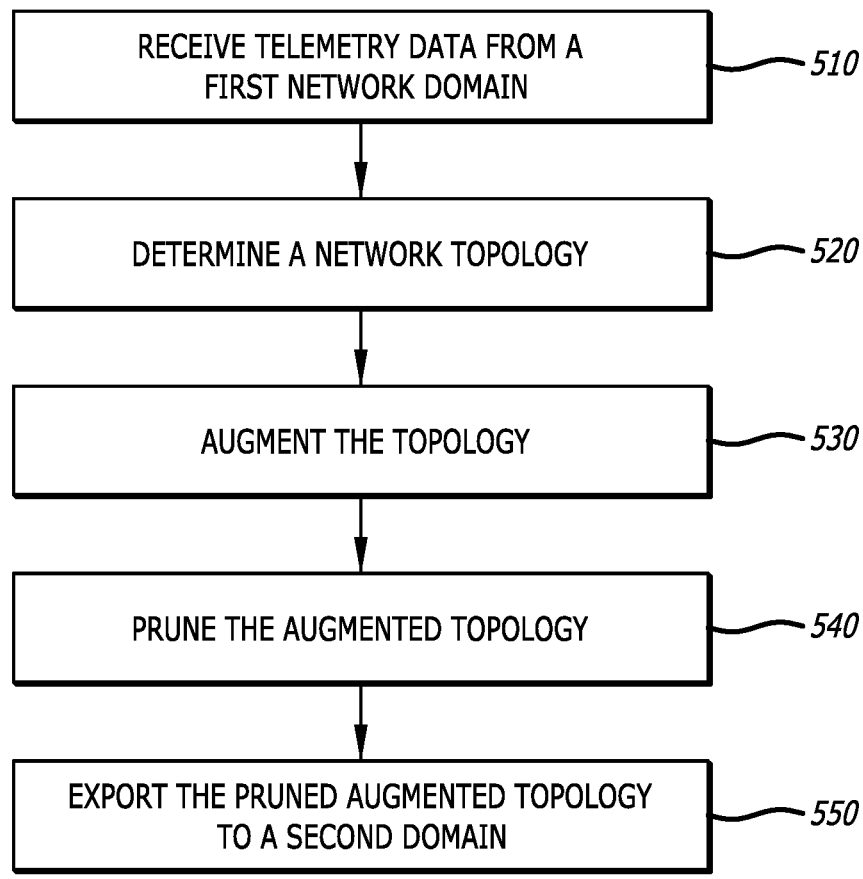
FIG. 5 is a flowchart depicting a process for exporting data to a second domain in accordance with various embodiments of the disclosure.

Referring to FIG. 5, a flowchart depicting a process 500 for exporting data to a second domain in accordance with various embodiments of the disclosure is shown. In many embodiments, the process 500 can receive telemetry data from a first network domain (block 510). As described previously, network telemetry can refer to data that is configured to collect and analyze data from various network devices in order to gain insights into network performance, traffic patterns, and other key metrics. This telemetry data can be utilized to identify and diagnose issues, optimize network performance, and improve security. The telemetry data can be received from a variety of devices either explicitly or gathered from different network device connections passing through a sustainability aggregation entity.

Subsequently, various embodiments of process 500 can determine a network topology (block 520). The physical or logical arrangement of the network devices can include servers, switches, routers, computers/clients, and other devices in communication with the network. In certain embodiments, the determined topology can be represented by a data structure, such as, but not limited to, a multi-layer topology graph. However, other types of representations are contemplated as well.

In further embodiments, the process 500 can augment the topology (block 530). For example, many networks may include devices within the topology that can be adjusted based on one or more sustainability-related capabilities and/or attributes. Often, the augmenting of the topology data is done by including various sustainability-related attributes within the topology data. However, other augmentation is contemplated.

In more embodiments, the process 500 can prune the augmented topology (block 540). As discussed previously, some embodiments may utilize a multi-layer topology graph to represent the augmented topology data. However, based on the needs of the specific application, not all data may need to be shared to outside domains. Thus, depending on various rules, thresholds, or other configurations, the augmented topology can be pruned to restrict or otherwise eliminate that data.

In response to the augmented data being pruned, the process 500 can export the pruned augmented topology to a second domain (block 550). In this way, external domains within a larger interconnected network may be able to receive visibility into one or more sustainability-related attributes or capabilities. This can allow for better network-wide decisions to be made regarding sustainability issues. In more embodiments, additional data can be verified such as, but not limited to, energy usage compliance, cost per hop, aggregated cost for data travel through the network, total power source utilization, etc.

Although a specific embodiment for a process 500 is described above with respect to FIG. 5, any of a variety of systems and/or processes may be utilized in accordance with embodiments of the disclosure. For example, the process 500 may be achieved within a single specialized device within the network or may be a result of various steps taken by a plurality of devices through the domain. The various elements described in FIG. 5 may also be interchangeable with other elements of FIGS. 1-4, and 6-8 as required to realize a particularly desired embodiment.

Figure 6:
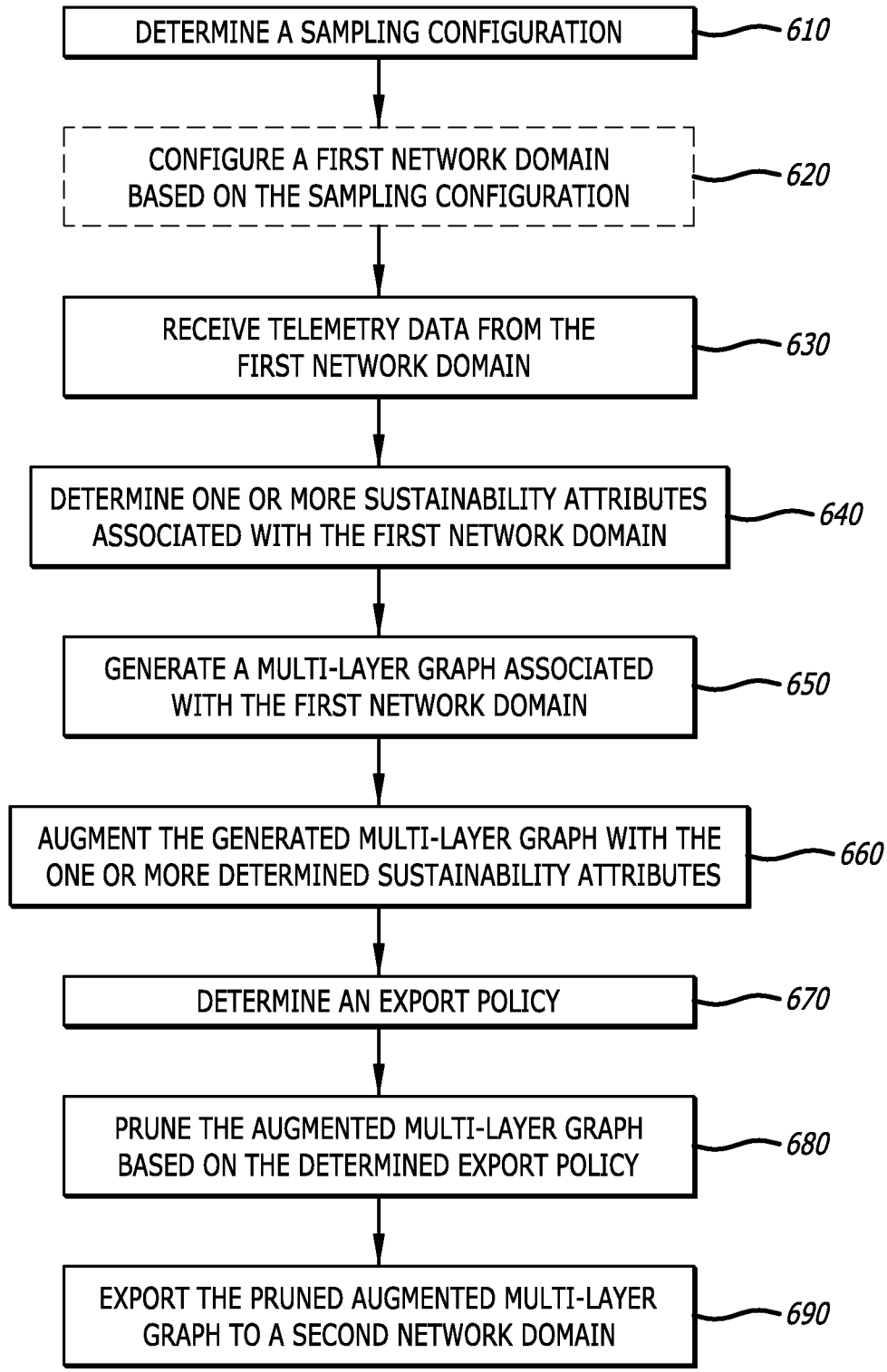
FIG. 6 is a flowchart depicting a more detailed process for exporting data to a second domain in accordance with various embodiments of the disclosure.

Referring to FIG. 6, a flowchart depicting a more detailed process 600 for exporting data to a second domain in accordance with various embodiments of the disclosure is shown. In many embodiments, the process 600 can determine a sampling configuration (block 610). The sampling configuration can be configured as a set of heuristics. As described above, the sampling configuration can be setup by a domain administrator based on the desired application.

In optional embodiments, the process 600 can configure a first network domain based on the sampling configuration (block 620). Indeed, the first network domain may transmit and/or receive various sampling configurations for each of the devices that act to generate sampling data. In this way, different devices within the network may sample or be sampled at different intervals or time periods. Data collected from these various sampling intervals can subsequently be integrated as needed for transmission or processing at a later time.

In additional embodiments, the process 600 can receive telemetry data from the first network domain. This telemetry data can be gathered from various devices within the network. The telemetry data may be formatted in numerous arrangements as needed for the desired application. The telemetry data can be formatted to include or omit certain types of data, for example.

In further embodiments, the process 600 can determine or more sustainability attributes associated with the first network domain (block 640). As described in more detail above, each device within a network can have a number of attributes and/or capabilities that can be related to one or more sustainability objectives. For example, network devices may have the ability to power down on command or at least enter a lower-power mode. Other attributes may include understanding what type of power source is used to power each device, or the historical usage and power consumption.

In more embodiments, the process 600 can generate a multi-layer topology graph associated with the first network domain (block 650). Often, these multi-layer topology graphs can be configured to represent the network topology. Upon generation of the graph, the process 600 can augment the generated multi-layer topology graph with the one or more determined sustainability attributes (block 660). As those skilled in the art will recognize, the augmentation can include formatting the graph data to include or otherwise reference the one or more sustainability attributes or capabilities.

Prior to export, various embodiments of the process 600 can determine an export policy (block 670). Often, a network administrator may not want to share all data related to a network with other domains. Conversely, an external domain may only want to receive certain portions of data which requires determining what data is suitable for export. In response, an export policy can be configured to determine which data should be shared with each domain.

Upon this export policy determination, some embodiments of the process 600 can prune the augmented multi-layer topology graph based on the determined export policy (block 680). As discussed above, pruning a multi-layer topology graph can be a process for removing unnecessary data. This determination of what is unnecessary can be dictated directly by the export policy. Upon pruning, the process 600 can export the pruned augmented multi-layer topology graph to a second network domain (block 690). In this way, the second network domain may be provided visibility to data related to the first network domain such as, but not limited to, sustainability-related data.

Although a specific embodiment for a process 600 is described above with respect to FIG. 6, any of a variety of systems and/or processes may be utilized in accordance with embodiments of the disclosure. For example, the process 600 may be achieved within a single specialized device within the network or may be a result of various steps taken by a plurality of devices through the domain. The various elements described in FIG. 6 may also be interchangeable with other elements of FIGS. 1-5, and 7-8 as required to realize a particularly desired embodiment.

Figure 7:
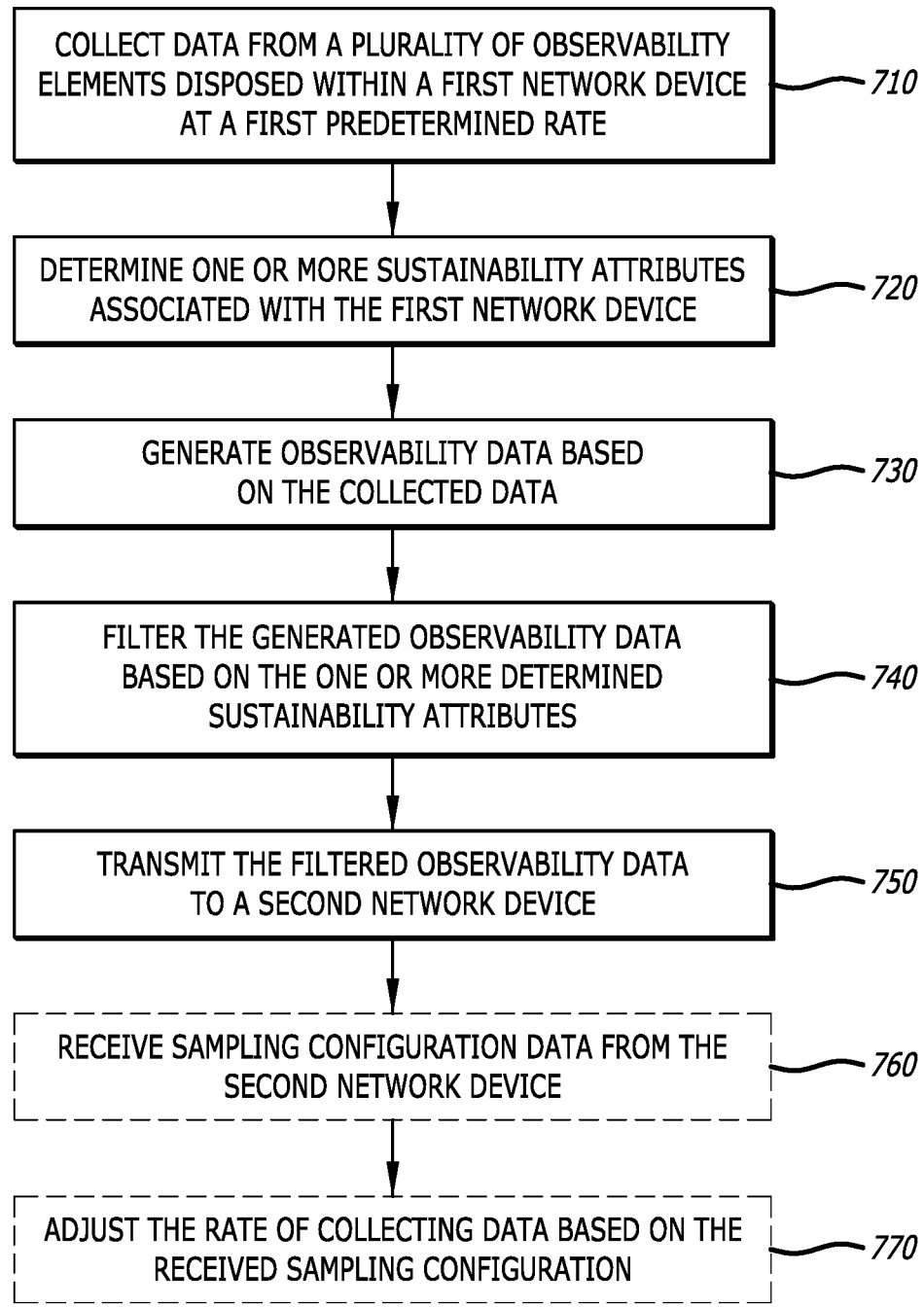
FIG. 7 is a flowchart depicting another process for exporting data to a second domain in accordance with various embodiments of the disclosure.

Referring to FIG. 7, a flowchart depicting another process 700 for exporting data to a second domain in accordance with various embodiments of the disclosure is shown. In many embodiments, the process 700 can collect data from a plurality of observability elements disposed within a first network device at a first predetermined rate (block 710). By way of non-limiting example, the predetermined rate can be set to collect data after a period of time or after a particular event.

During the collection of data, the process 700 can determine one or more sustainability attributes and/or capabilities associated with the first network device (block 720). In further embodiments, the process 700 can generate observability data based on the collected data (block 730). In various embodiments, the observability data can include, but is not limited to, a link-state graph of the network infrastructure combined and augmented with various devices such as the server, storage, etc.

In more embodiments, the process 700 can filter the generated observability data based on the one or more determined sustainability attributes (block 740). As previously discussed, the observability elements can be configured to provide tailored visibility to different stakeholders and/or tenants, depending on their needs. Upon filtering, the process 700 can transmit the filtered observability data to a second network device (block 750).

In optional embodiments, the second network device can generate sample configuration data. The process 700 can receive the sampling configuration data from the second network device (block 760). Further, in additional optional embodiments, the process 700 can adjust the rate of collecting data based on the received sampling configuration (block 770). Therefore, the sampling configuration can be formatted to indicate a change to the first predetermined rate such that a second predetermined rate can be set for collecting data.

Although a specific embodiment for a process 700 is described above with respect to FIG. 7, any of a variety of systems and/or processes may be utilized in accordance with embodiments of the disclosure. For example, the process 700 may be achieved within a single specialized device within the network or may be a result of various steps taken by a plurality of devices through the domain. Additionally, the process of adjusting data collection rate and/or the use of observability elements can be integrated within the processes described with respect to FIGS. 5-6. The various elements described in FIG. 7 may also be interchangeable with other elements of FIGS. 1-6, and 8 as required to realize a particularly desired embodiment.

Figure 8:
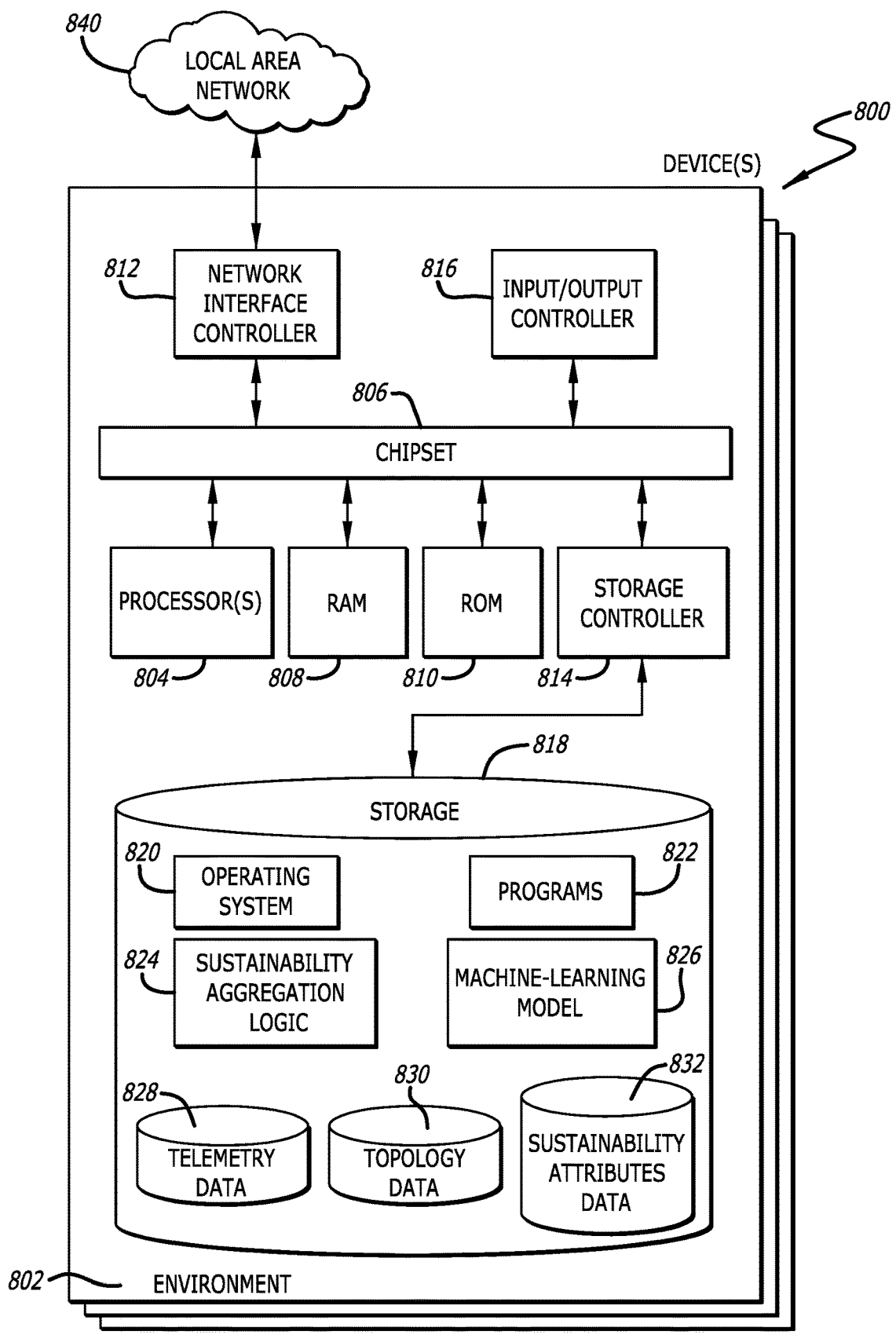
FIG. 8 is a conceptual block diagram of a device suitable for use in a sustainable cross-domain data distribution infrastructure in accordance with various embodiments of the disclosure.

Referring to FIG. 8, a conceptual block diagram of one or more devices 800 suitable for use in a sustainable cross-domain data distribution infrastructure in accordance with various embodiments of the disclosure is shown. In a number of embodiments, the device may be a sustainability aggregation device. The embodiment of the conceptual block diagram depicted in FIG. 8 can illustrate a conventional server computer, workstation, desktop computer, laptop, tablet, network appliance, e-reader, smartphone, or other computing device, and can be utilized to execute any of the application and/or logic components presented herein. The device 800 may, in some examples, correspond to physical devices or to virtual resources described herein.

In many embodiments, the device 800 may include an environment 802 such as a baseboard or "motherboard," in physical embodiments that can be configured as a printed circuit board with a multitude of components or devices connected by way of a system bus or other electrical communication paths. Conceptually, in virtualized embodiments, the environment 802 may be a virtual environment that encompasses and executes the remaining components and resources of the device 800. In more embodiments, one or more processors 804, such as, but not limited to, central processing units (CPUs) can be configured to operate in conjunction with a chipset 806. The processor(s) 804 can be standard programmable CPUs that perform arithmetic and logical operations necessary for the operation of the device 800.

In additional embodiments, the processor(s) 804 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 806 may provide an interface between the processor(s) 804 and the remainder of the components and devices within the environment 802. The chipset 806 can provide an interface to a random-access memory ("RAM") 808, which can be used as the main memory in the device 800 in some embodiments. The chipset 806 can further be configured to provide an interface to a computer-readable storage medium such as a read-only memory ("ROM") 810 or non-volatile RAM ("NVRAM") for storing basic routines that can help with various tasks such as, but not limited to, starting up the device 800 and/or transferring information between the various components and devices. The ROM 810 or NVRAM can also store other application components necessary for the operation of the device 800 in accordance with various embodiments described herein.

Different embodiments of the device 800 can be configured to operate in a networked environment using logical connections to remote computing devices and computer systems through a network, such as the network 840. The chipset 806 can include functionality for providing network connectivity through a network interface card ("NIC") 812, which may comprise a gigabit Ethernet adapter or similar component. The NIC 812 can be capable of connecting the device 800 to other devices over the network 840. It is contemplated that multiple NICs 812 may be present in the device 800, connecting the device to other types of networks and remote systems.

In further embodiments, the device 800 can be connected to a storage 818 that provides non-volatile storage for data accessible by the device 800. The storage 818 can, for example, store an operating system 820, applications 822, and data 828, 830, 832, which are described in greater detail below. The storage 818 can be connected to the environment 802 through a storage controller 814 connected to the chipset 806. In certain embodiments, the storage 818 can consist of one or more physical storage units. The storage controller 814 can interface with the physical storage units through a serial attached SCSI (SAS) interface, a serial advanced technology attachment (SATA) interface, a fiber channel (FC) interface, or other type of interface for physically connecting and transferring data between computers and physical storage units.

The device 800 can store data within the storage 818 by transforming the physical state of the physical storage units to reflect the information being stored. The specific transformation of physical state can depend on various factors. Examples of such factors can include, but are not limited to, the technology used to implement the physical storage units, whether the storage 818 is characterized as primary or secondary storage, and the like.

For example, the device 800 can store information within the storage 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 800 can further read or access information from the storage 818 by detecting the physical states or characteristics of one or more particular locations within the physical storage units.

In addition to the storage 818 described above, the device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 800. In some examples, the operations performed by a cloud computing network, and or any components included therein, may be supported by one or more devices similar to device 800. Stated otherwise, some or all of the operations performed by the cloud computing network, and or any components included therein, may be performed by one or more computer devices 800 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 818 can store an operating system 820 utilized to control the operation of the device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 818 can store other system or application programs and data utilized by the device 800.

In various embodiment, the storage 818 or other computer-readable storage media is encoded with computer-executable instructions which, when loaded into the device 800, may transform it from a general-purpose computing system into a special-purpose computer capable of implementing the embodiments described herein. These computer-executable instructions may be stored as application 822 and transform the device 800 by specifying how the processor(s) 804 can transition between states, as described above. In some embodiments, the device 800 has access to computer-readable storage media storing computer-executable instructions which, when executed by the device 800, perform the various processes described above with regard to FIGS. 1-7. In more embodiments, the device 800 can also include computer-readable storage media having instructions stored thereupon for performing any of the other computer-implemented operations described herein.

In still further embodiments, the device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can be configured to provide output to a display, such as a computer monitor, a flat panel display, a digital projector, a printer, or other type of output device. Those skilled in the art will recognize that the device

800 might not include all of the components shown in FIG. 8 and can include other components that are not explicitly shown in FIG. 8 or might utilize an architecture completely different than that shown in FIG. 8.

As described above, the device 800 may support a virtualization layer, such as one or more virtual resources executing on the device 800. In some examples, the virtualization layer may be supported by a hypervisor that provides one or more virtual machines running on the device 800 to perform functions described herein. The virtualization layer may generally support a virtual resource that performs at least a portion of the techniques described herein.

In many embodiments, the device 800 can include a sustainability aggregation logic 824. In previous embodiments, a plurality of devices were discussed, including a sustainability aggregation entity. Those embodiments may have indicated that the sustainability aggregation entity may have been a distinct device within or associated with a network/domain. However, additional embodiments may have indicated that the sustainability aggregation entity would be operable within a device already within the network. Such devices may operate normally as a switch, router, etc. but may also include a sustainability aggregation logic 824 that can carry out the steps and processes described for the sustainability aggregation entity. In further embodiments, the sustainability aggregation entity may be considered as having a sustainability aggregation logic 824.

In a number of embodiments, the storage 818 can include telemetry data 928. Telemetry data can refer to the process of collecting, analyzing, and interpreting data related to the behavior and performance of network devices and systems. This data can include information on network traffic, device health, user activity, and security events. Network telemetry data is often collected using specialized software tools and data collectors that gather information from network devices and applications. This data is then analyzed to identify performance issues, security threats, and other insights that can help network administrators optimize the network's efficiency and security. With telemetry data, network administrators can make informed decisions and take proactive measures to ensure the network's stability and reliability.

In various embodiments, the storage 818 can include topology data 930. As described above, network topology can refer to the arrangement or structure of a computer network, including the physical or logical layout of devices, nodes, and communication paths. Broadly, it can define how the components of a network are connected to each other and how data flows between them. There are various types of network topologies, such as bus, star, ring, mesh, and hybrid, each with its own advantages and disadvantages. Understanding the network topology is crucial for network administrators and the tools that support them as it can help to plan, design, and troubleshoot the network. By knowing the topology, potential points of failure can be identified, allowing for the opportunity to optimize performance, and improve security. Thus, topology data 930 can be configured to track these network relationships and any associated metadata that can be utilized for further network security and optimization, etc.

In still more embodiments, the storage 818 can include sustainability attributes data 932. As described within the discussion of FIG. 1, sustainability-related attributes can comprise a number of metrics, scores, or other data that relates to both power source type data and one or more sustainability-related capabilities within one or more network devices. Power source type data may include one or more negative environmental impacts from using the device, whereas sustainability-related capabilities may provide a list of available configurations for the device that can be adjusted to potentially reduce energy usage over time.

Finally, in many embodiments, data may be processed into a format usable by a machine-learning (ML) model 826 (e.g., feature vectors), and or other pre-processing techniques. The ML model 826 may be any type of ML model, such as supervised models, reinforcement models, and/or unsupervised models. The ML model 826 may include one or more of linear regression models, logistic regression models, decision trees, Naïve Bayes models, neural networks, k-means cluster models, random forest models, and/or other types of ML models 826. In some embodiments, the ML model 826 may be configured to optimize the sampling frequency in response to one or more input values. This may allow for the establishment of a predetermined sampling frequency that can be configured to be a part of the sampling configuration and modified in response to events. In further embodiments, the ML model 826 may provide for a more efficient closed loop configuration by implementing or providing settings that can reduce overall energy usage.

Although a specific embodiment for a device 800 suitable for use in a sustainable cross-domain data distribution infrastructure is described above with respect to FIG. 8, any of a variety of systems and/or processes may be utilized in accordance with embodiments of the disclosure. For example, the device 800 may be configured to carry out additional operations wherein the sustainability aggregation logic 824 is a secondary function of the device 800. In this way, a typical network device may be configured or converted to carry out the steps and processes associated with the sustainability aggregation entities that are described above. In additional embodiments, the device 800 may be virtualized and sold as a service to one or more external networks/domains. The elements depicted in FIG. 8 may also be interchangeable with other elements of FIGS. 1-7 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A method comprising:
   receiving telemetry data associated with a first network domain;
   generating a multi-layer topology graph for the first network domain;
   augmenting the multi-layer topology graph with one or more sustainability-related attributes;
   determining one or more export policies, wherein the one or more export policies include at least one sustainability attribute;
   pruning the augmented multi-layer topology graph based on the one or more export policies by filtering one or more elements from the graph based on a value of the at least one sustainability attribute associated with the one or more elements; and
   exporting the pruned augmented multi-layer topology graph to a second network domain.

2. The method of claim 1, wherein the telemetry data is received in real-time.

3. The method of claim 1, wherein the receiving of telemetry data is based on a sampling configuration.

4. The method of claim 3, wherein the sampling configuration comprises:
   a criteria of power consumption metrics; and
   a predetermined sampling frequency.

5. The method of claim 1, wherein the one or more sustainability-related attributes comprise at least one of the group consisting of: geolocation data, collateral consumption data, energy source data, or cost per source data.

6. The method of claim 1, wherein pruning of the augmented multi-layer topology graph comprises generating a subgraph.

7. The method of claim 6, wherein the subgraph obfuscates the one or more sustainability-related attributes.

8. The method of claim 7, wherein the obfuscation is performed by applying at least one filter to the augmented multi-layer topology graph.

9. The method of claim 8, wherein the at least one filter is based on one or more data governance rules or governmental regulations.

10. The method of claim 1, wherein pruning of the augmented multi-layer topology graph is based on one or more characteristics of the second network domain.

11. A sustainability aggregation device, comprising:
    a processor; and
    a memory, wherein the memory comprises a sustainability aggregation logic, that when executed by the processor, is configured to:
       receive telemetry data associated with a first network domain;
       generate a multi-layer topology graph for the first network domain;
       augment the multi-layer topology graph with one or more sustainability-related attributes;
       determine one or more export policies, wherein the one or more export policies include at least one sustainability attribute;
       prune the augmented multi-layer topology graph based on the one or more export policies by filtering one or more elements from the graph based on a value of the at least one sustainability attribute associated with the one or more elements; and
       export the pruned augmented multi-layer topology graph to a second network domain.

12. The device of claim 11, wherein the receiving of telemetry data is based on a sampling configuration.

13. The device of claim 12, wherein the sampling configuration comprises:
    a criteria of power consumption metrics; and
    a predetermined sampling frequency.

14. The device of claim 11, wherein the one or more sustainability-related attributes comprise at least one of the group consisting of: geolocation data, collateral consumption data, energy source data, or cost per source data.

15. The device of claim 11, wherein pruning of the augmented multi-layer topology graph comprises generating a subgraph.

16. The device of claim 15, wherein the subgraph obfuscates the one or more sustainability-related attributes.

17. The device of claim 16, wherein the obfuscation is performed by applying at least one filter to the augmented multi-layer topology graph.

18. The device of claim 17, wherein the at least one filter is based on one or more data governance rules or governmental regulations.

* * * * *